United States Patent [19]

Pampel

[11] 4,060,580

[45] Nov. 29, 1977

[54] PROCESS FOR THE PRODUCTION OF SHAPED COMPONENTS OF WOOD MATERIAL, ESPECIALLY BOARDS, BOUND WITH A HYDRAULIC BINDER, PREFERABLY CEMENT

[75] Inventor: Helmut Pampel, Volksen, Germany

[73] Assignee: Bison-werke Bahre & Greten GmbH & Co. KG, Germany

[21] Appl. No.: 596,523

[22] Filed: July 16, 1975

[30] Foreign Application Priority Data

July 16, 1974 Germany .............................. 2434212

[51] Int. Cl.$^2$ ...................... B28B 23/00; B29D 3/02; B29J 5/00

[52] U.S. Cl. ................................. 264/109; 264/333; 264/DIG. 43

[58] Field of Search ............... 264/109, 112, 333, 240; 427/204, 214

[56] References Cited

U.S. PATENT DOCUMENTS

| | | | |
|---|---|---|---|
| 2,689,975 | 9/1954 | Leng | 264/109 |
| 2,902,391 | 9/1959 | Daul et al. | 427/214 |
| 3,403,205 | 9/1968 | Ottenholm | 264/109 |
| 3,438,853 | 4/1969 | Haines et al. | 264/333 |
| 3,705,837 | 12/1972 | Breslauer | 264/109 |

OTHER PUBLICATIONS

Whittington, Whittington's Dictionary of Plastics Technomic, Stamford, Conn. (1968), p. 258 relied on.

Primary Examiner—Willard E. Hoag
Attorney, Agent, or Firm—Craig & Antonelli

[57] ABSTRACT

A process for the production of shaped articles from wood particles, especially chipboards, wherein the basic cellulosic material comprised of wooden articles is admixed with at least one mineralizing agent, water, and a hydraulic binder such as cement, the mixture is shaped and then pressed at a constant temperature above the freezing point; the process being characterized in that the water required for activating the hydraulic binder is added and admixed with the basic cellulosic material before the addition of the mineralizing agent and the hydraulic binder.

8 Claims, No Drawings

PROCESS FOR THE PRODUCTION OF SHAPED COMPONENTS OF WOOD MATERIAL, ESPECIALLY BOARDS, BOUND WITH A HYDRAULIC BINDER, PREFERABLY CEMENT

This invention relates to a process for the production of shaped components made of a wood material, especially boards, bonded with a hydraulic binder, preferably cement, wherein at least one mineralizing agent, water, and a hydraulic binder are added to the basic cellulosic fiber material consisting of wooden particles or the like, and the thus-prepared mixture is then shaped and pressed at a constant temperature lying above the freezing point.

In a conventional process of this type (German Pat. No. 915,317), the disadvantages of the known hot impregnating method and the cold impregnating method are first discussed and then the recommendation is advanced to impregnate, under cold conditions, the vegetable fiber material, prepared by comminution into pieces of various sizes, with a metal sulfide solution and to incorporate into the thus-impregnated fiber material base (not acid) substances, such as CaO, thereby forming on the surface of the fiber material gel layers which are hardening. During the tacky condition of the gel layers, wherein the entire amount of added water is 50-70% of the hydraulic binder. In this way, a crude plastic mass is formed which is capable of avoiding a reduction in volume produced by the pressure of the pressing operation in the article, which is compressed by 3-5% of the total thickness, due to its elasticity after the pressure of the pressing operation has ceased. Soluble calcium compounds stemming from the binder penetrate into the fiber material, reacting therein with the metal sulfate under the formation of insoluble salts, and thereafter the plastic mixture is filled into molds, pressed, and the thus-shaped components are removed from the mold after the compression step and transferred to the setting stage. The moisture of the crude material is selected so that the desired plasticity of the material is produced. It is to be pointed out that the total amount of liquid to be incorporated into the mixture must be within 50-70% of the weight of cement added thereto.

Although such shaped components of wood material have proven themselves suitable for most of the purpose of application, they still have the disadvantage that several of their technological properties, such as bending strength, are substantially poorer than those of chipboards bound with a synthetic resin.

This invention is based on the problem of improving the conventional process so that a uniform distribution of the mineralizing agent or agents on the surface of the individual wood particles or the like is achieved, in order to improve the technological properties of the shaped components of wood materials, wherein hydraulic binders are added during the manufacturing process, to such an extent that these properties correspond to the technological properties of chipboards bound with synthetic resins and in particular so that these properties exhibit quality characteristics which remain at a constant level.

The basic material according to this invention comprises wood particles preferably having dimensions in the range of 7-15 mm width, 11-25 mm length, and 0.3-0.6 mm thickness as well as fine particles, such as dust and fibre (see Appl. U.S. Ser. No. 575,041 (1975) for disclosure of exemplary particles contempleted).

In order to solve this problem, the invention proposes to add the amount of water required for binding the hydraulic binder to the basic cellulosic material before the mineralizing agent or agents is or are added thereto. This has the effect that the moisture of the basic cellulosic material is adjusted to a specific value, so that the mineralizing agent or agents is or are uniformly distributed on the surfaces of the particles of the basic material. That is, the basic material is wetted to a specific moisture content as explained morefully below, before the mineralizing agents are introduced. The basic material should be brought, prior to the addition of the mineralizing agent or agents, to a moisture content of 70-70% by weight of the wetted basic material; an optimum is attained if the moisture content of this basic material is brought to 80% by weight. Moreover, it is advantageous, in case water must be added because the basic cellulosic material is not moist enough, to admix a surface-active agent to this water of addition, because the mineralizing agent or agents then adhere(s) more satisfactorily to the basic material. It is suitable to take care that the total moisture of the mixed material is brought, before the compression step, to a water-cement factor of 0.45 - 0.6, i.e. that less water is added than has herefore been the case. It will be understood that the term "water-cement factor" means the ratio of water to cement by weight in a given volume of the mixture. Especially favorable results were attained by choosing the water-cement factor to be 0.55. As for the temperature of the mixed material, care should be taken that this temperature, when the material exits from the mixer, or from the last mixer, is about 15°-40° C, preferably 35° C., since in this way the binding temperature of the hydraulic binder is reached, which is necessary for constant technological properties.

It will be understood that the mineralizing agents suitable for this invention are conventional exemplary $Al_2(SO_4)_3$, and include such in powder and/or fluid form and are added to the basic cellulosic material in an amount that ranges in generally from 1.5 to 5 parts by weight per 100 parts by weight of the basic material (wooden particles). The amount of water in the final mixture based on 100 parts by weight of the basic material (wooden particles) is from 160 to 180 parts by weight.

The surface-active agents useful for this invention are exemplary "BORAX", "PRIL" or the like and can include a mixture of polyglycolethers and/or a combination of aliphatic alcoholpolyglycolethers. From 0.1 to 0.3 parts by weight of the surface-active agent is added per 100 parts by weight of the water contained in the mixture.

Also it will be appreciated that the temperatures used during pressing or compression range generally from 10° to 30° C. and the pressure employed is generally from 10 to 30 k/cm2.

This invention will be further understood from the following preferably example.

In a mixer of the "PADDEL" type 100 parts by weight of wooden particles having a size that ranges of 9 mm width, 12 mm length, and 0.45 mm thickness are admixed for 5 minutes with 140 parts by weight of water to provide a water content of 170%. Then 3 parts by weight of a mineralizing agent, i.e. "PRIL" and 309 parts by weight of a hydraulic binder, i.e. cement, are added to the mixer to provide a water-cement factor of 0.55. These materials are mixed with the wet wooden particles for a period of 3 minutes at 35° C. The resulting mixture is poured into a mold for forming a board and the mixture is compressed at 20° then cured for 8 hours at 80° C. Thereafter the compressed board is removed from the mold and allowed to set for 18 days at 25° C, hereafter climatizing at 70° C 6-8 hours to board compensating moisture of 10%.

What is claimed is:

1. In a process for making shaped articles of a wood material bonded with hydraulic cement wherein at least one mineralizing agent, water and a hydraulic cement are added to the cellulosic material comprised of wood particles, and the thus-prepared mixture is then shaped and pressed at a constant temperature above the freezing point, the improvement comprising: adding the amount of water, required for the hydraulic cement, to said cellulosic material and mixing said water therewith; thereafter adding said at least one mineralizing agent, reactive with a component of said cement, to said cellulosic material and then adding said hydraulic cement to the resulting wet cellulosic material.

2. A process according to claim 1 wherein the cellulosic material is brought to a moisture content of 70-90% by weight before the mineralizing agent is added.

3. A process according to claim 2, wherein the cellulosic material is brought to a moisture content of 75-85% by weight.

4. A process according to claim 3, wherein the cellulosic material is brought to a moisture content of 80% by weight.

5. A process according to claim 1, wherein a surface-active agent is added to the water which is admixed with the cellulosic material before addition of the mineralizing agent and the addition of the hydraulic binder.

6. A process according to claim 1, wherein the amount of mineralizing agent added to said wet cellulosic material is from 1.5 to 5 parts by weight per 100 parts by weight of the cellulosic material.

7. A process according to claim 1, wherein said at least one mineralizing agent is uniformly distributed on the surfaces of the wooden particles of said cellulosic material due to the prior addition of said water.

8. A process according to claim 1 wherein the mineralizing agent is $Al_2(SO_4)_3$.

* * * * *